US007739366B2

(12) United States Patent
Ansari (10) Patent No.: US 7,739,366 B2
(45) Date of Patent: Jun. 15, 2010

(54) MANAGEMENT OF J2EE APPLICATIONS

(75) Inventor: Akbar Ali Ansari, Nashua, NH (US)

(73) Assignee: BEA Systems, Inc., Redwood Shores, CA (US)

( * ) Notice: Subject to any disclaimer, the term of this patent is extended or adjusted under 35 U.S.C. 154(b) by 1050 days.

(21) Appl. No.: 11/132,518

(22) Filed: May 19, 2005

(65) Prior Publication Data

US 2006/0265710 A1 Nov. 23, 2006

(51) Int. Cl.
G06F 15/173 (2006.01)
G06F 9/455 (2006.01)

(52) U.S. Cl. .............................. 709/223; 709/224; 718/1

(58) Field of Classification Search ................. 709/223, 709/229
See application file for complete search history.

(56) References Cited

U.S. PATENT DOCUMENTS

| 6,061,721 | A  | * | 5/2000  | Ismael et al. ............... 709/223 |
| 6,772,178 | B2 | * | 8/2004  | Mandal et al. .............. 709/223 |
| 7,051,324 | B2 | * | 5/2006  | Gissel et al. ................ 717/166 |
| 7,209,898 | B2 | * | 4/2007  | Pfeiffer et al. ............... 705/51 |
| 7,487,513 | B1 | * | 2/2009  | Savchenko et al. .......... 719/320 |
| 2002/0174421 | A1 | * | 11/2002 | Zhao et al. .................. 717/174 |
| 2002/0191952 | A1 | * | 12/2002 | Fiore et al. ..................... 386/46 |
| 2004/0003122 | A1 | * | 1/2004  | Melillo ........................ 709/246 |
| 2004/0019662 | A1 | * | 1/2004  | Viswanath et al. .......... 709/220 |
| 2004/0019663 | A1 | * | 1/2004  | Viswanath et al. .......... 709/220 |
| 2004/0019670 | A1 | * | 1/2004  | Viswanath ................... 709/223 |
| 2004/0194066 | A1 | * | 9/2004  | Frey et al. .................... 717/127 |
| 2005/0216510 | A1 | * | 9/2005  | Kautzleben et al. ....... 707/104.1 |
| 2005/0216585 | A1 | * | 9/2005  | Todorova et al. ............ 709/224 |
| 2005/0216860 | A1 | * | 9/2005  | Petrov et al. ................. 715/810 |
| 2005/0262190 | A1 | * | 11/2005 | Mamou et al. .............. 709/203 |
| 2006/0002374 | A1 | * | 1/2006  | Trost et al. ................... 370/352 |
| 2006/0015601 | A1 | * | 1/2006  | Jasnowski et al. ........... 709/223 |
| 2006/0036734 | A1 | * | 2/2006  | Breeden et al. ............. 709/225 |
| 2006/0112379 | A1 | * | 5/2006  | Chirakansakcharoen et al. .......................... 717/166 |
| 2007/0198291 | A1 | * | 8/2007  | Pfeiffer et al. ................. 705/1 |
| 2009/0077175 | A1 | * | 3/2009  | DeAnna et al. ............. 709/203 |

OTHER PUBLICATIONS

JSR—77 J2EE MIB Management. 2003-2004, Advent Inc. http://www.adventnet.com/products/snmpadaptor/help/jboss_snmp_adaptor/jsr77_j2ee_mib_management.html.*
JSR 77 Standard Stats 2003-2008 http://cwiki.apache.org/GMOxDEV/jsr-77-performance-monitoring-stats-interfaces.html.*

(Continued)

Primary Examiner—Ario Etienne
Assistant Examiner—Sargon N Nano
(74) Attorney, Agent, or Firm—Fliesler Meyer LLP (57) ABSTRACT

In accordance with one embodiment of the present invention, there are provided mechanisms and methods for providing an application programming interface (API) for managing applications deployed on one or more servers. These mechanisms and methods can enable a software developer to create a single program that can discover and browse resources, such as JDBC connection pools, deployed applications and other resources, on any J2EE Application server, for example. In an embodiment, the APIs are part of the J2EE Management Specification, which specifies interface mechanisms for J2EE Application servers to describe their resources using a standard data model. Embodiments employing APIs conforming to the J2EE Management Specification can enable third party software, for example, to be used to monitor the applications.

17 Claims, 5 Drawing Sheets

OTHER PUBLICATIONS

Laessig, "Score Big with JSR 77, the J2EE Management Specification, Summary" http://www.javaworld.com/javaworld/jw-o6-2002/jw-0614-mgmt.html, Apr. 18, 2005, 5 pages.

Laessig, "Score Big with JSR 77, the J2EE Management Specification, Event Handling" http://www.javaworld.com/javaworld/jw-o6-2002/jw-0614-mgmt-p3.html, Apr. 18, 2005, 5 pages.

Laessig, "Score Big with JSR 77, the J2EE Management Specification, Access the Managed Objects" http://www.javaworld.com/javaworld/jw-o6-2002/jw-0614-mgmt-p2..html, Apr. 18, 2005, 4 pages.

* cited by examiner

MANAGEMENT OF J2EE APPLICATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to application monitoring, and more particularly to a mechanism for management of J2EE applications.

BACKGROUND

With the explosive growth of the World Wide Web in recent years, service providers have turned to the popular Java™ 2 Platform, Enterprise Edition ("J2EE") as a platform of choice for providing services. (Java™ is a trademark of Sun Microsystems, Inc.) Service providers may install applications on one or more J2EE application servers. Absent a standard for doing so, service providers often prepared custom and proprietary interfaces in order to monitor the status of the applications on the servers. Since each service provider provided a different way of doing so, confusion at the monitoring (or instrumentation layer) resulted.

One proposed solution to the confusion is the JSR 77 standard which specifies a standard set of interfaces that service providers (and others) will use to monitor services and applications and application providers will incorporate into their applications allowing them to be monitored. One approach to implementing the JSR 77 standard calls for deploying monitoring agents at each of the servers in order to collect the specified information.

However, monitoring agents can take up significant resources on the server systems on which the agents are deployed, adding overhead and reducing performance. Accordingly, what is needed are improved mechanisms and methods for implementing interfaces for managed applications.

DETAILED DESCRIPTION

In accordance with one embodiment of the present invention, there are provided mechanisms and methods for providing an application programming interface (API) for managing applications deployed on one or more servers. These mechanisms and methods can enable a software developer to create one or more programs that can discover and browse resources, such as JDBC connection pools, deployed applications and other resources, on any J2EE Application server, for example. In an embodiment, the APIs are part of the J2EE Management Specification, which specifies interface mechanisms for J2EE application servers to describe their resources using a standard data model. Embodiments employing APIs conforming to the J2EE Management Specification can enable third party software, for example, to be used to monitor the applications.

In an embodiment, a method for managing J2EE applications is provided. The method includes receiving a request for information about processes in at least one server from a requestor. Requestors may be human users, proxies or automated entities. Resources for obtaining the monitoring information can be instantiated at the at least one server using a "lazy caching" technique, in which resources are instantiated when necessary to meet the request. Monitoring information includes obtaining information about number of running servers in a domain. In one embodiment, a requestor is provided the number of running servers in the domain for example. In some embodiments, other information may be included, such as what applications exist and what resources are used by what application. Some embodiments may provide additional information, including without limitation, how many applications are deployed on the server, the number of connections in existence and other types of information indicated by the JSR 77 interface specification may be collected. Resources include objects for collecting the monitoring information from processes resident on the managed server. In an embodiment, instantiated objects include MBeans created to perform data collection. In an embodiment, the lazy caching technique includes maintaining a single quiescent thread of execution from which objects are instantiated upon receiving the request from the requester. The monitoring information received from the resources instantiated at the at least one server is provided to the requestor. The monitoring information provided to the requestor is converted to a standardized interface compatible with the requestor. In an embodiment, the information is provided in a standardized format specified by the JSR77 interface specification.

While the present invention is described with reference to an embodiment in which MBeans are created in order to monitor applications and processes in the managed servers, the present invention is not limited to the use of MBeans and may be practiced using other types of instantiated objects without departing from the scope of the embodiments claimed.

Figure 1:
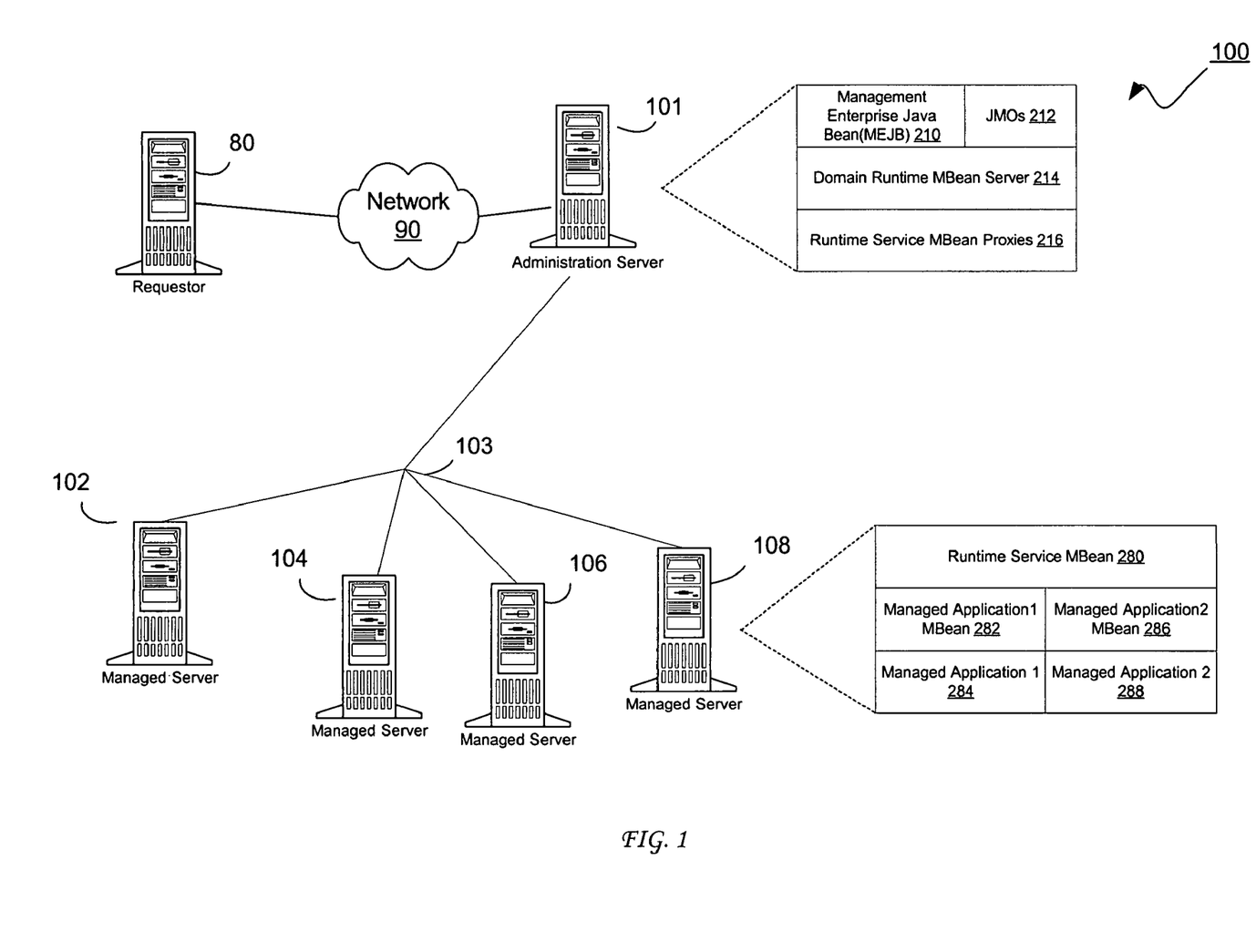
FIG. 1 is functional block diagram of an example computing environment in which techniques for managing J2EE applications in accordance with an embodiment may be implemented.

FIG. 1 is functional block diagram of an example computing environment in which techniques for managing J2EE applications in accordance with an embodiment may be implemented. As shown in FIG. 1, a domain 100 includes a J2EE management framework to provide a mechanism by which one or more requestors 80 (not part of domain 100) can obtain information about processes executing on one or more managed servers 102-108 through a central point administration server 101. A requester can also obtain information about the administration server 101 since it is also part of the domain 100. A communications connection 103 connects administration server 101 with the managed servers 102-108. Connection 103 may include a network, shared memory interface or other types of communication interconnect. While the invention is described with reference to an embodiment in which multiple machines support administration server 101 and managed servers 102-108, other embodiments may include installations that comprise of a single WebLogic® server instance or multiple instances, each hosted on one or more physical machines. In yet further embodiments, administration server 101 may exist as a separate process executing on the same physical machine as one or more of the managed servers 102-108.

In one embodiment, a requestor 80 sends a request to the administration server 101 via in intermediary communications mechanism, such as a network 90 (not part of domain 100). The administration server 101 determines a running entity using a look up or other convenient mechanism. The running entity could be running on one or more managed server(s) 102-108. The managed server 108 may instantiate resources before serving the request. The managed server 108 then serves the request to the administration server 101. The administration server 101 then creates a corresponding J2EE Managed Object (JMO) and returns the result to the requestor 80.

An administration server 101 may receive a request for information about entities or objects, such as without limitation applications, servers and other computational entities or more managed servers 102-108 or the administration server 101 from a requestor (not shown). Monitoring data may be provided to the requestor via a Management Enterprise Java Bean (MEJB) 210 of administration server 101. Each instance of an application server resource type can be represented by a J2EE Managed Object (JMO) 212. The MEJB 210 facilitates a JSR77 compliant interface to management information about the JMOs 212. In embodiments following the J2EE Management data model, JMOs may be organized hierarchically in a tree structure having a root JMO, the J2EEDomain, which represents a collection of Application server instances that are logically related.

Administration server 101 also includes a domain runtime MBean server 214 for managing runtime MBeans with domain-wide functions. Further, administration server 101 includes runtime server MBean proxies 216 for reflecting information from the runtime service MBeans in one or more of the managed servers 102-108. Administration server 101 may also include system administration tools (not shown) for communicating with the administration server 101 to cause the administration server 101 to perform configuration and monitoring of the managed servers 102-108 and applications in the domain.

Resources at the one or more managed servers 102-108 are instantiated for obtaining the monitoring information. Managed server 108 includes a runtime service MBean 280 that acts as an anchor point for objects, MBeans in the illustrated embodiment, that may be instantiated on server 108, for example, to collect information about applications resident on that server. For example, server 108 includes a managed application 1 284 that is being monitored via managed application 1 MBean 282 and a managed application 2 288 that is being monitored via managed application 2 MBean 286. Other applications may exist on server 108. Further, objects other than MBeans may be instantiated to monitor the application on server 108 in other embodiments. The monitoring information received from the resources instantiated at the one or more managed servers 102-108 is sent to the administration server 101. Administration Server then creates a corresponding compliant entity called J2EE Managed Object (JMO) on the Administration server 101. The administration server 101 then serves the request via MEJB 210, which provides the information to the requestor via the MEJB 210. Using the MEJB 210, the administration server 101 can convert the monitoring information to a standardized interface compatible with the requestor.

While the present invention is described with reference to an embodiment in which managing J2EE applications that are executable programs written in the Java™ programming language and usually (though not always) executed in response to an invocation from an HTML page, the present invention is not limited to the Java™ programming language and may be practiced using other programming languages, i.e., JSP and the like without departing from the scope of the embodiments claimed. In one embodiment, the administration server 101 and the managed servers 102-108 utilize an application server product, such as WebLogic® Server by BEA systems of San Jose, Calif.

Figure 2A:
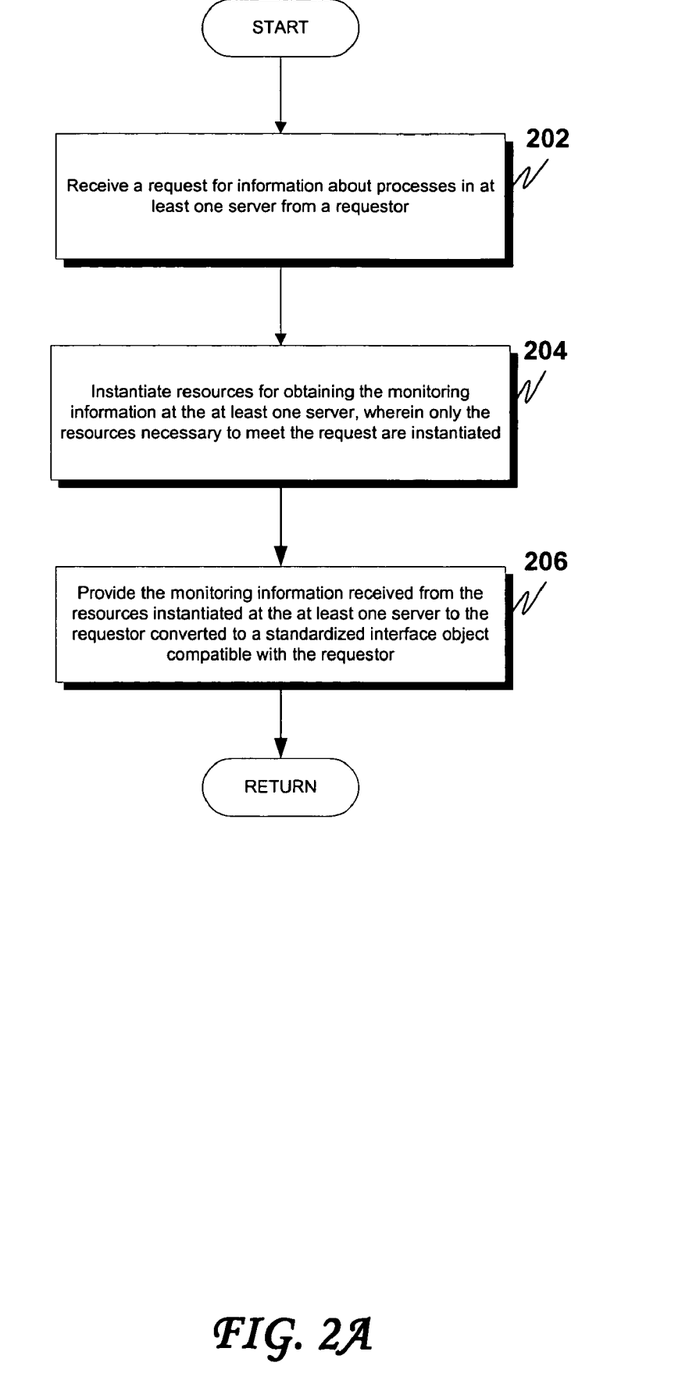
FIG. 2A is an operational flow diagram illustrating a high level overview of a technique for managing J2EE applications in accordance with an embodiment.

FIG. 2A is an operational flow diagram illustrating a high level overview of a technique for managing J2EE applications in accordance with an embodiment. The technique for managing J2EE applications shown in FIG. 2A is operable with an application resident on an administration server, such as administration server 101 of FIG. 1, for example. As shown in FIG. 2A, a request for information about processes in at least one server is received from a requestor (block 202). Resources at the at least one server are instantiated for obtaining the monitoring information (block 204). The monitoring information received from the resources instantiated at the at least one server is provided to the requestor (block 206). The monitoring information may be converted to a standardized interface compatible with the requestor, such as the JSR 77 standard compliant interface for example.

Figure 2B:
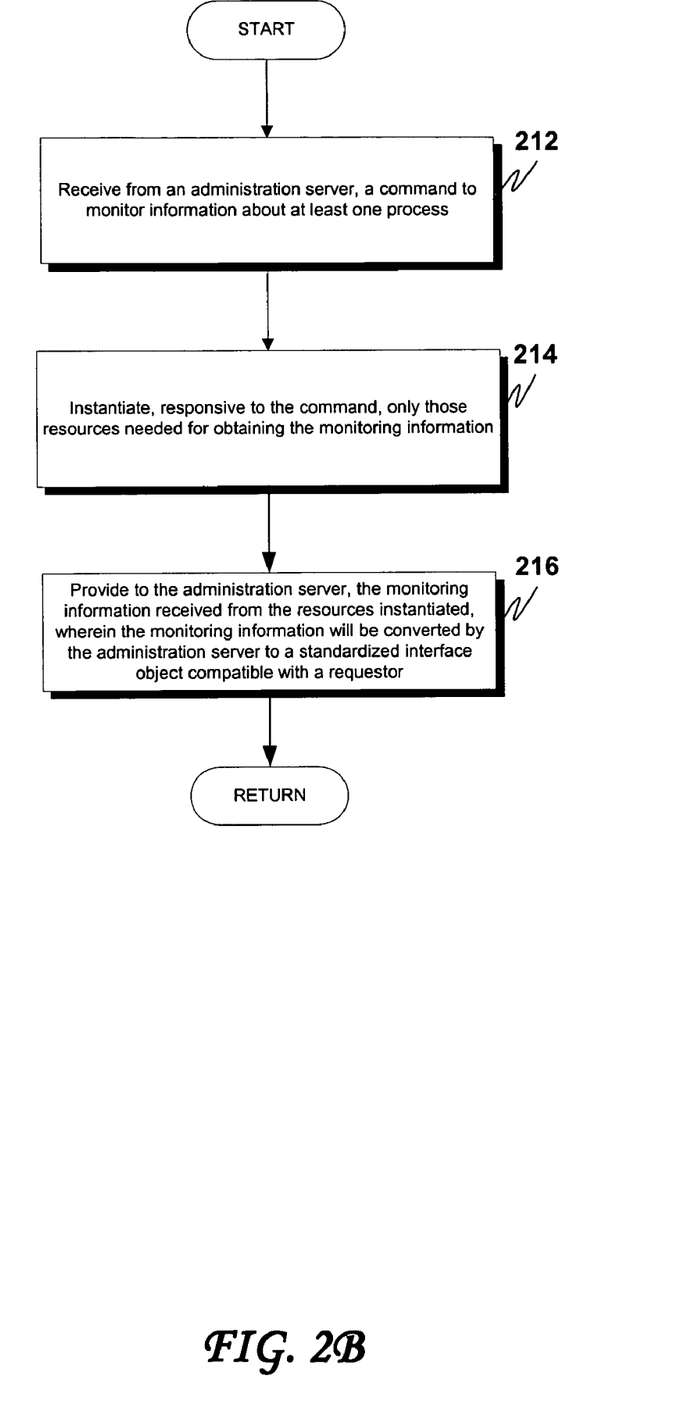
FIG. 2B is an operational flow diagram illustrating a high level overview of a technique for monitoring management information about J2EE applications in accordance with an embodiment.

FIG. 2B is an operational flow diagram illustrating a high level overview of a technique for obtaining management information about J2EE applications in accordance with an embodiment. The technique for monitoring J2EE applications shown in FIG. 2B is operable with an application resident on one or more managed servers, such as managed server 108 of FIG. 1, for example. As shown in FIG. 2B, a command is received from an administration server (block 212). The command directs the managed server to monitor information about at least one process executing on the managed server or the administration server. Responsive to the command, only the resources necessary for obtaining the monitoring information are instantiated on the managed server (block 214). Resources may include one or more objects, processes or the like, but in one embodiment include runtime MBeans. Monitoring information received from the instantiated resources is provided to the administration server (block 216). The administration server will convert the monitoring information to a standardized interface object compatible with a requestor.

Figure 2C:
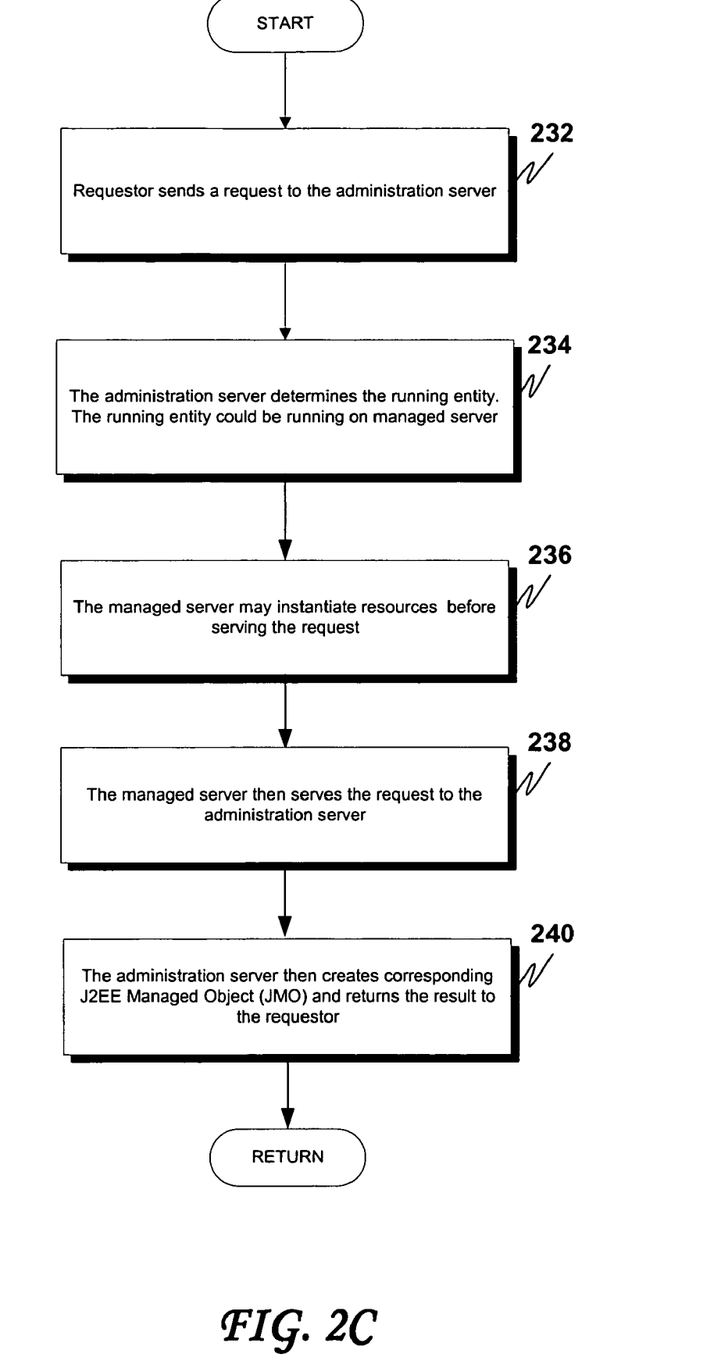
FIG. 2C is an operational flow diagram illustrating a high level overview of a technique for receiving management information about J2EE applications in accordance with an embodiment.

FIG. 2C is an operational flow diagram illustrating a high level overview of a technique for receiving management information about J2EE applications in accordance with an embodiment. The technique for monitoring J2EE applications shown in FIG. 2C is operable with an domain comprising an administration server 101 and one or more managed servers, such as managed server 108 of FIG. 1, for example. As shown in FIG. 2C, a requestor sends a request to the administration server (block 232). The administration server determines the running entity using a look up or other convenient mechanism (block 234). The running entity could be running on managed server. The managed server may instantiate resources (block 236) before serving the request. The managed server then serves (block 238) the request to the administration server. The administration server then creates corresponding J2EE Managed Object (JMO) and returns the result to the requestor (block 240).

In embodiments following the J2EE Management data model, each instance of an application server resource type is represented by a JMO. The J2EE Management Specification describes which types of resources will be represented by a JMO. The JMOs comprise a limited set of attributes that are used to describe the location of the object in the data model. For further information about the J2EE Management model, reference may be had to the J2EE Management Specification, the entirety of which is incorporated herein by reference and is available at: http://jcp.org/aboutJava/communityprocess/final/jsr077/index.html.

In embodiments following the J2EE Management data model, JMOs may be organized hierarchically in a tree structure. The root JMO is the J2EEDomain, which represents a collection of Application server instances that are logically related. The J2EEDomain includes the object names for instances of the J2EEServer JMO, each of which represents a server instance in the collection. Applications can browse the hierarchy of JMOs and recursively query for object names and look up the JMOs that are named by the query results.

In embodiments in which JMOs are implemented using a wrapper for MBeans, changes in an MBean that corresponds to a JMO are immediately available through the J2EE Management APIs.

In an embodiment, monitoring data may be provided to a requestor through a Management Enterprise Java Bean (MEJB). For example, an application may access the JMOs through a remote interface for the MEJB called javax.management.j2ee.Management. In an embodiment, monitoring data may be retrieved through the MEJB by: 1.) looking up the javax.management.j2ee.ManagementHome interface through the Administration Server's Java Naming and Directory Interface (JNDI) tree under the name ejb.mgmt.MEJB; and 2) Using ManagementHome to construct an instance of javax.management.j2ee.Management, which is the MEJB's remote interface.

In an embodiment and by way of example, an example class for use in accessing the MEJB for a server domain in order to obtain names for all JMOs will next be described. The example class invokes javax.management.j2ee.Management.queryNames method. This method returns the object name for all JMOs in the domain. The listing for the example class is as follows:

```
import java.io.IOException;
import java.net.MalformedURLException;
import java.util.Iterator;
import java.util.Set;
import java.util.Properties;
import javax.management.j2ee.Management;
import javax.management.j2ee.ManagementHome;
import javax.management.AttributeNotFoundException;
import javax.management.InstanceNotFoundException;
import javax.management.ObjectName;
import javax.management.QueryExp;
import javax.naming.Context;
import javax.naming.InitialContext;
import javax.naming.NamingException;
import javax.ejb.CreateException;
public class GetJMONames {
    static String url = "t3://localhost:7001";
    static String user = "weblogic";
    static String password = "weblogic";
    public static void main (String [ ] args) {
        try {
            getAllJMONames( );
```

-continued

```
        }catch(Exception e){
            System.out.println(e);
        }
    }
    public static Management getMEJBRemote( )
        throws IOException, MalformedURLException,
        NamingException,CreateException
    {
        Context context = getInitialContext( );
        ManagementHome home = (ManagementHome)
            context.lookup("ejb.mgmt.MEJB");
        Management bean = home.create( );
        return bean;
    }
    public static Context getInitialContext( )
            throws NamingException
    {
        Properties p = new Properties( );
        p.put(Context.INITIAL_CONTEXT_FACTORY,
            "weblogic.jndi.WLInitialContextFactory");
        p.put(Context.PROVIDER_URL, url);
        if (user != null) {
            p.put(Context.SECURITY_PRINCIPAL, user);
            if (password == null)
                password = "";
            p.put(Context.SECURITY_CREDENTIALS,
                password);
        }
        return new InitialContext(p);
    }
    public static void getAllJMONames( )
    {
        try {
            Management rhome = getMEJBRemote( );
            String string = "";
            ObjectName name = new ObjectName(string);
            QueryExp query = null;
            Set allNames = rhome.queryNames(name, query);
            Iterator nameIterator = allNames.iterator( );
            while(nameIterator.hasNext( )) {
                ObjectName on =
                    (ObjectName)nameIterator.next( );
                System.out.println(on.getCanonicalName( ) +
                    "\n");
            }
        } catch (Exception ex) {
            ex.printStackTrace( );
        }
    }
}
```

In other aspects, the invention encompasses in some embodiments, computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to providing mechanisms and methods for managing J2EE applications as discussed herein.

Figure 3:
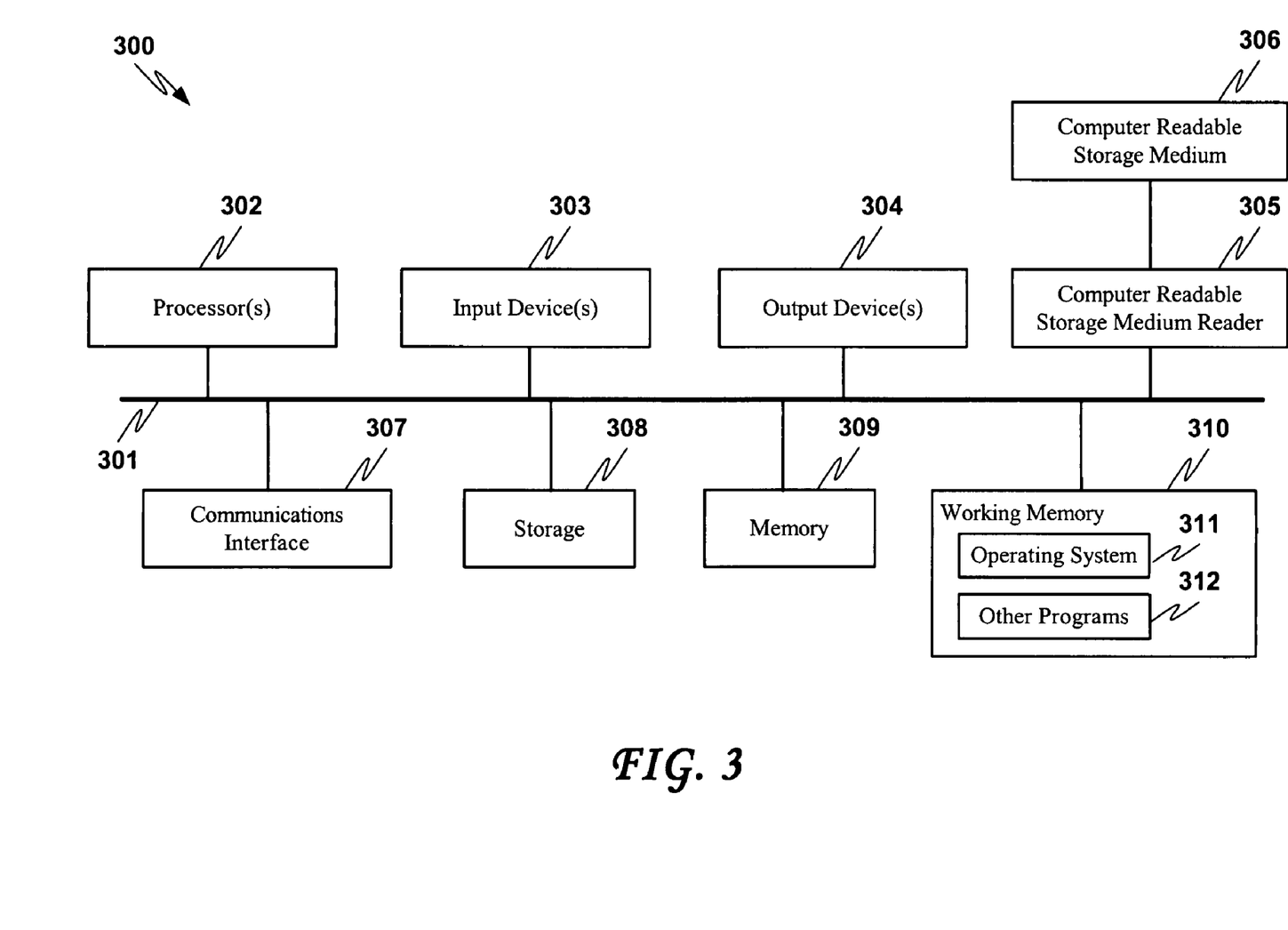
FIG. 3 is a hardware block diagram of an example computer system, which may be used to embody one or more components in accordance with an embodiment.

FIG. 3 illustrates an exemplary processing system 300, which can comprise one or more of the elements of FIG. 1. Turning now to FIG. 3, an exemplary computing system is illustrated that may comprise one or more of the components of FIG. 1. While other alternatives might be utilized, it will be presumed for clarity sake that components of the systems of FIG. 1 are implemented in hardware, software or some combination by one or more computing systems consistent therewith, unless otherwise indicated.

Computing system 300 comprises components coupled via one or more communication channels (e.g., bus 301) including one or more general or special purpose processors 302, such as a Pentium®, Centrino®, Power PC®, digital signal processor ("DSP"), and so on. System 300 components also include one or more input devices 303 (such as a mouse, keyboard, microphone, pen, and so on), and one or more output devices 304, such as a suitable display, speakers, actuators, and so on, in accordance with a particular application. (It will be appreciated that input or output devices can also similarly include more specialized devices or hardware/software device enhancements suitable for use by the mentally or physically challenged.)

System 300 also includes a computer readable storage media reader 305 coupled to a computer readable storage medium 306, such as a storage/memory device or hard or removable storage/memory media; such devices or media are further indicated separately as storage 308 and memory 309, which may include hard disk variants, floppy/compact disk variants, digital versatile disk ("DVD") variants, smart cards, read only memory, random access memory, cache memory, and so on, in accordance with the requirements of a particular application. One or more suitable communication interfaces 307 may also be included, such as a modem, DSL, infrared, RF or other suitable transceiver, and so on for providing inter-device communication directly or via one or more suitable private or public networks or other components that may include but are not limited to those already discussed.

Working memory 310 further includes operating system ("OS") 311 elements and other programs 312, such as one or more of application programs, mobile code, data, and so on for implementing system 300 components that might be stored or loaded therein during use. The particular OS or OSs may vary in accordance with a particular device, features or other aspects in accordance with a particular application (e.g. Windows®, WindowsCE™, Mac™, Linux, Unix or Palm™ OS variants, a cell phone OS, a proprietary OS, Symbian™, and so on). Various programming languages or other tools can also be utilized, such as those compatible with C variants (e.g., C++, C#), the Java™ 2 Platform, Enterprise Edition ("J2EE") or other programming languages in accordance with the requirements of a particular application. Other programs 312 may further, for example, include one or more of activity systems, education managers, education integrators, or interface, security, other synchronization, other browser or groupware code, and so on, including but not limited to those discussed elsewhere herein.

When implemented in software (e.g. as an application program, object, agent, downloadable, servlet, and so on in whole or part), a learning integration system or other component may be communicated transitionally or more persistently from local or remote storage to memory (SRAM, cache memory, etc.) for execution, or another suitable mechanism can be utilized, and components may be implemented in compiled or interpretive form. Input, intermediate or resulting data or functional elements may further reside more transitionally or more persistently in a storage media, cache or other volatile or non-volatile memory, (e.g., storage device 308 or memory 309) in accordance with a particular application.

Other features, aspects and objects of the invention can be obtained from a review of the figures and the claims. It is to be understood that other embodiments of the invention can be developed and fall within the spirit and scope of the invention and claims. The foregoing description of preferred embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A method for managing applications, the method comprising: receiving, at an administration server from a requester, a request for monitoring information about processes in at least one managed server, wherein the at least one managed server is one of one or more in a plurality of managed servers that connect with the administration server in a server domain; upon receiving the request from the requester, looking up a management home interface through a naming and directory interface; using the management home interface to construct an instance of a management home object that provides remote access to monitoring information of the one or more managed servers, wherein the monitoring information is represented using a plurality of management objects that are organized hierarchically in a tree structure, wherein the tree structure represents the server domain and each management object of the plurality of management objects represents a managed server of the plurality of managed servers; invoking a method at the management home object to obtain names for the plurality of management objects in the domain; instantiating, at the at least one managed server, at least one management object in the plurality of management objects for obtaining the monitoring information, wherein the resources are instantiated when necessary to meet the request; and providing to the requester, through a remote interface of the management home object, the monitoring information received from the resources at least one management object instantiated at the at least one managed server, the monitoring information converted to a standardized interface object compatible with the requester; wherein instantiating at least one management object in the plurality of management objects for collecting the monitoring information from processes resident on the at least one managed server comprises:

employing a lazy caching process to instantiate objects upon receiving the request from the requestor, wherein the lazy caching process allows the plurality of management objects to be instantiated when necessary to meet the request.

2. The method of claim 1, further comprising:

freeing the instantiated at least one management object at the at least one managed server.

3. The method of claim 1, wherein providing to the requestor, the monitoring information received from the at least one management object instantiated at the at least one managed server, the monitoring information converted to a standardized interface object compatible with the requestor comprises:

providing the information in a standardized format.

4. The method of claim 3, wherein providing the information in a standardized format comprises:

providing the monitoring information in a standardized format specified by the Java Specification Request (JSR) 77 interface specification.

5. The method of claim 1, wherein instantiating at least one management object in the plurality of management objects for collecting the monitoring information from processes resident on the at least one managed server comprises:

instantiating JSR77 compliant managed beans (MBeans) for collecting the monitoring information from processes resident on the at least one managed server.

6. The method of claim 1, wherein employing a lazy caching process to instantiate objects upon receiving the request from the requestor enables agent-less monitoring of processes.

7. The method of claim 1, wherein employing a lazy caching process to instantiate objects upon receiving the request from the requestor comprises: maintaining a single quiescent thread from which objects are instantiated upon receiving the request is received from the requestor.

8. The method of claim 1, wherein instantiating, at the at least one managed server, resources for obtaining the monitoring information comprises:

requesting metrics from the at least one managed server, the metrics corresponding to the monitoring information requested.

9. A non-transitory computer-readable medium carrying one or more sequences of instructions for managing applications, which instructions, when executed by one or more processors, cause the one or more processors to carry out the steps of:

receiving, at an administration server from a requestor, a request for monitoring information about processes in at least one managed server in a plurality of managed servers that connect with the administration server in a server domain;

upon receiving the request from the requestor, looking up a management home interface through a naming and directory interface;

using the management home interface to construct an instance of a management home object that provides remote access to monitoring information of the one or more managed servers, wherein the monitoring information is represented using a plurality of management objects that are organized hierarchically in a tree structure, wherein the tree structure represents the server domain and each management object of the plurality of management objects represents a managed server of the plurality of managed servers;

invoking a method at the management home object to obtain names for the plurality of management objects in the domain;

instantiating, at the at least one managed server, at least one management object in the plurality of management objects for obtaining the monitoring information; and providing to the requestor, through a remote interface of the management home object, the monitoring information received from the at least one management object instantiated at the at least one managed server, the monitoring information converted to a standardized interface object compatible with the requestor;

wherein the instructions for carrying out the step of instantiating at least one management object in the plurality of management objects for collecting the monitoring information from processes resident on the at least one managed server further comprise instructions for carrying out the steps of:

employing a lazy caching process to instantiate objects upon receiving the request from the requestor, wherein the lazy caching process allows the plurality of management objects to be instantiated when necessary to meet the request.

10. The computer-readable medium as recited in claim 9, further comprising instructions for carrying out the step of:

freeing the instantiated at least one management object at the at least one managed server.

11. The computer-readable medium as recited in claim 9, wherein the instructions for carrying out the step of providing to the requestor, the monitoring information received from the at least one management object instantiated at the at least one managed server, the monitoring information converted to a standardized interface object compatible with the requestor further comprise instructions for carrying out the step of:

providing the monitoring information in a standardized format.

12. The computer-readable medium as recited in claim 11, wherein the instructions for carrying out the step of providing the monitoring information in a standardized format further comprise instructions for carrying out the step of:

providing the information in a standardized format specified by the JSR77 interface specification.

13. The computer-readable medium as recited in claim 9, wherein the instructions for carrying out the step of instantiating at least one management object in the plurality of management objects for collecting the monitoring information from processes resident on the at least one managed server further comprise instructions for carrying out the step of:

instantiating JSR77 compliant MBeans for collecting the monitoring information from processes resident on the at least one managed server.

14. The computer-readable medium as recited in claim 9, wherein the instructions for carrying out the step of employing a lazy caching process to instantiate objects upon receiving the request from the requestor further comprise instructions for carrying out the steps of: enabling agent-less monitoring of processes.

15. The computer-readable medium as recited in claim 9, wherein the instructions for carrying out the step of employing a lazy caching process to instantiate objects upon receiving the request from the requestor further comprise instructions for carrying out the steps of: maintaining a single quiescent thread from which objects are instantiated upon receiving the request is received from the requestor.

16. A system for managing applications, comprising: one or more managed servers that connect with one administration server;

said administration server capable of:
receiving, from a requestor, a request for monitoring information about processes in at least one managed server;
upon receiving the request from the requestor, looking up a management home interface through a naming and directory interface; and
using the management home interface to construct an instance of a management home object that provides remote access to monitoring information of the one or more managed servers, wherein the monitoring information is represented using a plurality of management objects that are organized hierarchically in a tree structure, wherein the tree structure represents the server domain and each management object of the plurality of management objects represents a managed server of the plurality of managed servers;
providing to the requestor, through a remote interface of the management home object, the monitoring information received from the at least one management object instantiated at the at least one managed server, the monitoring information converted to a standardized interface object compatible with the requestor; and each one of the one or more managed servers capable of:
upon receiving the request, instantiating at least one management object in the plurality of management objects for obtaining the monitoring information; and serving the administration server with the monitoring information; wherein instantiating at least one management object in the plurality of management objects for collecting the monitoring information from processes resident on the at least one managed server comprises:
employing a lazy caching process to instantiate objects upon receiving the request from the requestor, wherein the lazy caching process allows the plurality of management objects to be instantiated when necessary to meet the request.

17. The system of claim 16, wherein:
the administration server includes one or more runtime server proxies that reflect information from runtime service in the one or more managed servers.

* * * * *

UNITED STATES PATENT AND TRADEMARK OFFICE
CERTIFICATE OF CORRECTION

| | | |
|---|---|---|
| PATENT NO. | : 7,739,366 B2 | Page 1 of 1 |
| APPLICATION NO. | : 11/132518 | |
| DATED | : June 15, 2010 | |
| INVENTOR(S) | : Akbar Ali Ansari | |

It is certified that error appears in the above-identified patent and that said Letters Patent is hereby corrected as shown below:

In column 2, line 42, delete "requester." and insert -- requestor. --, therefor.

In column 2, line 65, delete "requester" and insert -- requestor --, therefor.

In column 9, line 47, in claim 9, delete "non- transitory" and insert -- non-transitory --, therefor.

Signed and Sealed this
Ninth Day of August, 2011

David J. Kappos
*Director of the United States Patent and Trademark Office*